(No Model.)

W. J. GOING.
ADJUSTABLE SUPPORT FOR INCANDESCENT LAMPS.

No. 598,218. Patented Feb. 1, 1898.

Witnesses.
Mark W. Dewey
H. M. Seamans

Inventor.
William J. Going,
By C. H. Duell
his Attorney

UNITED STATES PATENT OFFICE.

WILLIAM JOSEPH GOING, OF AMSTERDAM, NEW YORK, ASSIGNOR OF ONE-HALF TO LEONARD WELDON, OF SAME PLACE.

ADJUSTABLE SUPPORT FOR INCANDESCENT LAMPS.

SPECIFICATION forming part of Letters Patent No. 598,218, dated February 1, 1898.

Application filed May 26, 1897. Serial No. 638,231. (No model.)

*To all whom it may concern:*

Be it known that I, WILLIAM JOSEPH GOING, of Amsterdam, in the county of Montgomery, in the State of New York, have invented new and useful Improvements in Adjustable Supports for Incandescent Lamps, of which the following, taken in connection with the accompanying drawings, is a full, clear, and exact description.

My invention relates to adjustable supports for incandescent lamps and other light devices; and the object is to provide a simple and inexpensive support that may be easily and quickly adjusted universally.

To this end my invention consists in the combination, with a bracket having a hemispherical cavity, of a ring swiveled on the outer edge of the bracket, a part journaled in diametrically opposite sides of the ring, a rod threaded on one end entering said part and adapted to bear upon the wall of the said cavity, and a second rod to slide on the first-mentioned rod; and my invention consists in certain other combinations of parts hereinafter described, and specifically set forth in the claims.

Figure 1:
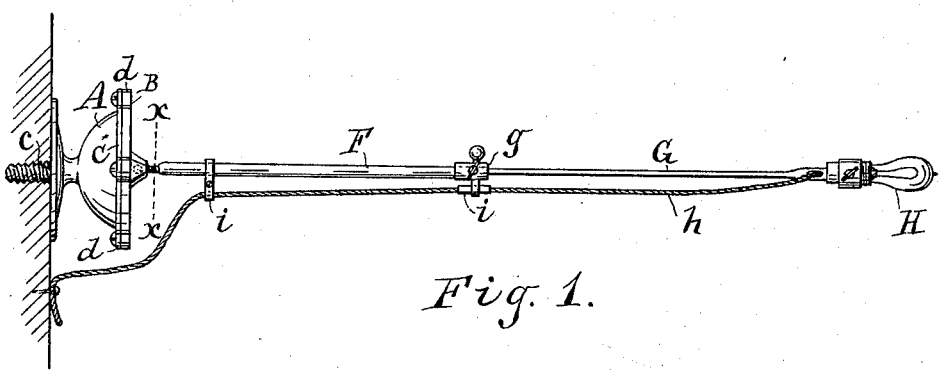
Figures 2, 3:
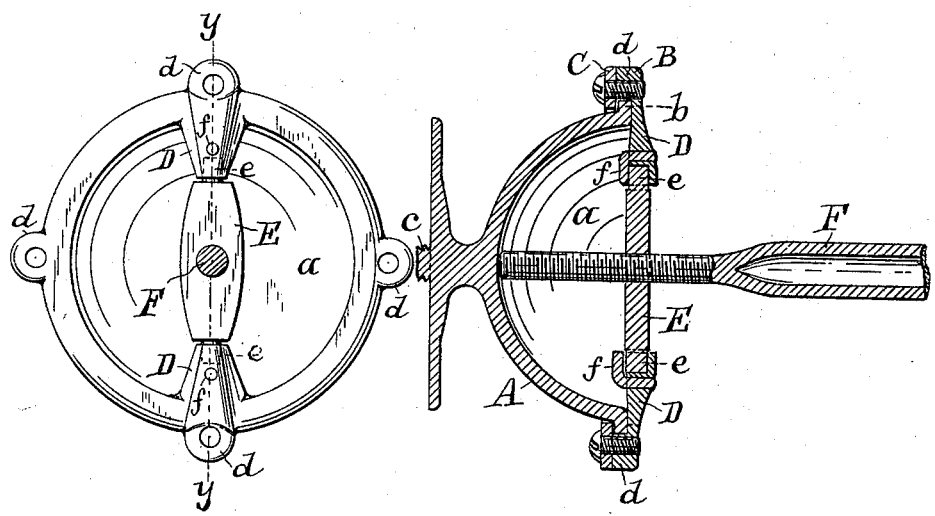

In the drawings hereto annexed and forming a part of this specification, Figure 1 is a side elevation of my improved adjustable support fixed to a side wall. Fig. 2 is an enlarged front view of the same, taken on line $x\,x$ of Fig. 1; and Fig. 3 is a sectional view taken on line $y\,y$ of Fig. 2.

Referring specifically to the drawings, A is the bracket, having the hemispherical cavity $a$ in its front face, with an outwardly-flanged edge $b$ and a screw $c$ to enter the wall. Several screws or nails may be substituted for the single integral screw, if desired.

A pair of concentric rings B and C are secured loosely by means of screws passing through four projections $d\,d\,d\,d$ on the rings to the flange, so that they will turn easily thereon in a plane coincident with that of the flange.

On diametrically opposite sides of the ring B are two inwardly-extending projections D D, with cavities or recesses in their ends to receive pintles $e\,e$ of a nut or bar E, extending across between the ends of the projections D D. In order to prevent the pintles from coming out of the cavities, angular rivets $f\,f$ are secured in the projections D D, so that their ends will bear upon the pintles $e\,e$.

A tube F, having one end contracted and threaded, passes at right angles through the nut E and is adapted to bear with its end on the wall of the cavity to hold it rigidly in place in any position. The position of the tube F may be changed and extended in any direction from the bracket by simply slightly unscrewing the tube in the nut E to remove its end from the wall of the cavity, then moving it to the position desired, and then turning the tube to set its end against the said wall, as shown in Fig. 3 of the drawings.

The adjustable arm formed by the tube F is extended in length by a small rod G, sliding within it. It will be obvious that the rod G may slide along one side of the tube, if desired. A set-screw $g$ holds the rod G rigidly within the tube. When the support is used for an incandescent lamp H, the same is mounted on the end of the rod G, as shown in Fig. 1.

A flexible conducting-cord $h$ extends from the lamp through eyes in small brackets $i\,i$ of insulating material secured to the tube F.

Having described my invention, what I claim as new, and desire to secure by Letters Patent, is—

1. In an adjustable support, the combination of a bracket having a hemispherical cavity, a ring swiveled on the outer edge of the bracket, a part extending between and journaled in diametrically opposite sides of the said ring, and a rod threaded on one end and extending through said part and adapted to bear upon the wall of the said cavity, substantially as described and shown.

2. In an adjustable support, the combination of a bracket having a hemispherical cavity, a ring swiveled on the outer edge of the bracket, a part extending between and journaled in diametrically opposite sides of said ring, a rod threaded on one end and extending through said part and adapted to bear upon the wall of the said cavity, and a second rod to slide on the first-mentioned rod, as set forth.

3. In an adjustable support, the combination of a bracket for attachment to a wall, having a hemispherical cavity in its front side, a ring swiveled on the outer edge of the circular edge of the bracket, a part extending between and journaled in diametrically opposite sides of the said ring, a tube threaded on one end and extending through the center of said part and adapted to bear upon the wall of the said cavity, and a rod to slide in said tube, substantially as described and shown.

4. In an adjustable support, the combination of a bracket, having a hemispherical cavity and an outwardly-extending circular flange on its edge, rings on opposite sides of the flange secured together and adapted to rotate thereon, inwardly-extending projections on one of the rings containing recesses, a bar with pintles on its ends extending diametrically across the said cavity with its pintles in the recesses, and a rod threaded on one end and extending through said bar and adapted to bear upon the wall of the said cavity, as set forth.

5. In an adjustable support, the combination of a bracket having a hemispherical cavity and an outwardly-extending circular flange on its edge, rings on opposite sides of the flange secured together and adapted to rotate thereon, inwardly-extending projections on one of the rings containing recesses, a bar with pintles on its ends extending diametrically across the said cavity with its pintles in the recesses, a tube threaded on one end and extending through said bar and adapted to bear upon the wall of the said cavity, and a rod to slide in said tube having an incandescent lamp secured to its end, as set forth.

In testimony whereof I have hereunto signed my name.

WILLIAM JOSEPH GOING. [L. S.]

Witnesses:
    EDWARD J. MAXWELL,
    LEONARD WELDON.